United States Patent [19]
Wilkes et al.

[11] Patent Number: 6,089,754
[45] Date of Patent: Jul. 18, 2000

[54] THRUST BEARING

[75] Inventors: Joseph J. Wilkes, Holland; Ascanio M. DeCamillo, Norristown, both of Pa.

[73] Assignee: Kingsbury, Inc., Philadelphia, Pa.

[21] Appl. No.: 09/209,403

[22] Filed: Dec. 10, 1998

[51] Int. Cl.[7] .................................................. F16C 17/06
[52] U.S. Cl. .......................................... 384/122; 384/307
[58] Field of Search ..................................... 384/122, 307, 384/308, 306, 117

[56] References Cited

U.S. PATENT DOCUMENTS

| | | | |
|---|---|---|---|
| 4,501,505 | 2/1985 | Chambers | 384/152 |
| 5,007,745 | 4/1991 | Ball et al. | 384/307 |

*Primary Examiner*—Lenard A. Footland
*Attorney, Agent, or Firm*—John F. A. Earley; John F. A. Earley, III; Harding, Earley, Follmer & Frailey

[57] ABSTRACT

A thrust bearing for use with a shaft having a collar mounted thereon, comprises a base ring, a series of thrust bearing shoes positioned on the base ring, each shoe having a leading edge connected to a trailing edge by an inner diameter edge and an outer diameter edge, each thrust bearing shoe having a working face with a bearing liner on its surface, a shoe pivot member on each shoe allowing the shoe to pivot in any direction, an oil distribution groove formed in the working face of each shoe near the leading edge of each shoe and extending radially for substantially the entire distance between the inner and outer diameter edges of each shoe, each oil distribution groove having an inner end and an outer end connected by a leading edge and a trailing edge, an oil feed line leading to each oil distribution groove for feeding oil to each oil distribution groove, and a recess formed in the working face of each shoe commencing at the trailing edge of the oil distribution groove and extending rearwardly therefrom to develop hydrodynamic film pressure on the leading edge of each shoe to ensure that each shoe tilts properly at light loads.

21 Claims, 7 Drawing Sheets

THRUST BEARING

BACKGROUND OF THE INVENTION

1. Field of the Invention

This invention relates to thrust bearings, and more particularly concerns thrust bearings having a leading edge oil distribution groove.

2. Description of the Prior Art

Prior to Kingsbury's LEG thrust bearings, conventional thrust bearings were lubricated by feeding oil into passageways in the base ring that lead to the shoes, and flooding the inside of the base ring and the shoes with oil. However, this system of lubrication consumed a large quantity of oil and created a large power loss.

Kingsbury's LEG thrust bearings, which are described in Kingsbury's U.S. Pat. No. 4,501,505, which is incorporated herein by reference, overcame the drawbacks of these conventional thrust bearings by providing oil lubricant where it is needed and used, at the working face of the shoe, rather than by flooding the inside of the base ring and the shoes with oil, resulting in a reduction in the amount of lubricating oil needed and a reduction in the frictional power losses, permitting operation at lower film temperatures, and increasing the load carrying capacity of the bearing.

In practice, Kingsbury's LEG thrust bearings have worked well over the years in many high-speed turbomachinery applications. However, industry trends have been to design higher speed machines that are commonly tested under low load conditions prior to field application. At certain high speed/low load conditions (e.g. speeds above 275 feet per second at the mean diameter of the thrust bearing and thrust loads less than 100 psi unit loading), we have noticed that higher oil supply pressures are required for the LEG at the design oil flow and that when higher thrust loads are eventually applied, the oil supply pressure drops to normal levels. If the machine's lubrication system can not accomodate the higher oil supply pressures, the bearing receives less than design oil flow at high speed/low load conditions which causes higher film temperatures.

SUMMARY OF THE INVENTION

It is an object of this invention to provide a thrust bearing having the advantages of the Kingsbury LEG thrust bearing, and that operates efficiently at both light loads and high loads.

These and other objects are accomplished by providing a thrust bearing having a base ring, and a series of thrust bearing shoes positioned on the base ring, with each shoe having an oil distribution groove formed in its working face near the leading edge of the shoe and a recess formed in the working face of each shoe commencing at the trailing edge of the oil distribution groove and extending rearwardly therefrom to develop hydrodynamic film pressure on the leading edge of each shoe to ensure that each shoe tilts properly at light loads. In one embodiment of the invention, the recess formed in the working face of each shoe is a pocketed region having a constant depth. In another embodiment of the invention, the recess formed in the working face of each shoe forms a ramp in the working face of each shoe in which the depth of the recess is deepest at the leading edge of the recess and diminishes to no depth at the trailing edge of the recess.

LEG is a trademark of Kingsbury, Inc., Philadelphia, Pa.

DETAILED DESCRIPTION OF THE DRAWINGS

Turning now to the drawings, there is shown a thrust bearing 11 for use with a shaft 13 having a collar 15 mounted on shaft 13 and rotatable therewith. The thrust bearing 11 comprises a base ring 17, and a series of shoes 19 positioned around the base ring 17.

Each shoe 19 has a leading edge 21 connected to a trailing edge 23 by an inner diameter edge 25 and an outer diameter edge 27. The direction of rotation of the collar 15 is indicated by an arrow 29.

Each shoe 19 includes a working face 31, and working face 31 has an outer diameter edge 33 and an inner diameter edge, which in the embodiments of the invention shown in the drawings corresponds to inner diameter edge 25.

A shoe pivot 35 is mounted on each shoe 19 so as to face away from the working face 31 of the shoe 19, and is provided with a spherical surface to allow the shoe 19 to pivot freely in any direction to conform to the side surfaces of the collar 15.

An oil distribution groove 37 is formed in the working face 31 of the shoe 19 near the leading edge 21 of the shoe and extends radially for substantially the entire distance between inner diameter edge 25 and outer diameter edge 27 of the shoe 19. Oil distribution groove 37 has an inner end 39 and an outer end 41 connected together by a leading edge 43 and a trailing edge 45.

Optionally, but preferably, a bleed groove 47 is provided, which extends radially from the inner end 39 of the oil distribution groove 37 to the inner diameter edge 25 of the shoe 19 for supplying oil to the inner diameter edge area of the shoe 19 downstream of the bleed groove 47, which downstream inner diameter area would otherwise be starved of oil by the centrifugal inertial effects of rotating the collar 15.

Preferably, trailing edge 45 of oil distribution groove 37 is chamfered so as to provided a chamfered edge for more easily allowing oil to flow from the oil distribution groove 37 to cover the shoe working face 31 with oil during rotation of shaft 13 and collar 15.

Retaining means, such as retaining pins 79 which extend radially from the shoe 19 into an annular groove 81 in the base ring 17, are provided to assist in retaining the shoes 19 on the base ring 17. Screws also may be used to retain the shoes 19 on the base ring 17.

Preferably, mounted between the shoes 19 and the base ring 17 in thrust bearing 11 are a series of upper leveling plates 83 and lower leveling plates 85 which are placed alternately around the base ring 17 in an annular groove 87. Lower leveling plates 85 are positioned by axially directed lower leveling plate retainer dowels 89, and upper leveling plates 83 are positioned by upper leveling plate retainer set screws 91 which are radially directed.

Shoe pivots 35 bear on the upper leveling plates 83, and the action of the alternately placed leveling plates 83, 85 serves to distribute the load evenly among the shoes 19.

A recess 93 is formed in the working face 31 of each shoe 19 to develop hydrodynamic film pressure on the leading edge 21 of each shoe 19 to ensure that during operation at light loads the shoe 19 tilts properly, that is, with the gap between the shoe 19 at its leading edge 21 and the collar 15 being larger than the gap between the shoe 19 at its trailing edge 23 and the collar 15.

Recess 93 has an inner end 95 and an outer end 97 connected together by a leading edge 99 and a trailing edge 101. The leading edge 99 of recess 93 commences at the trailing edge 45 of the oil distribution groove 37.

Figure 3:
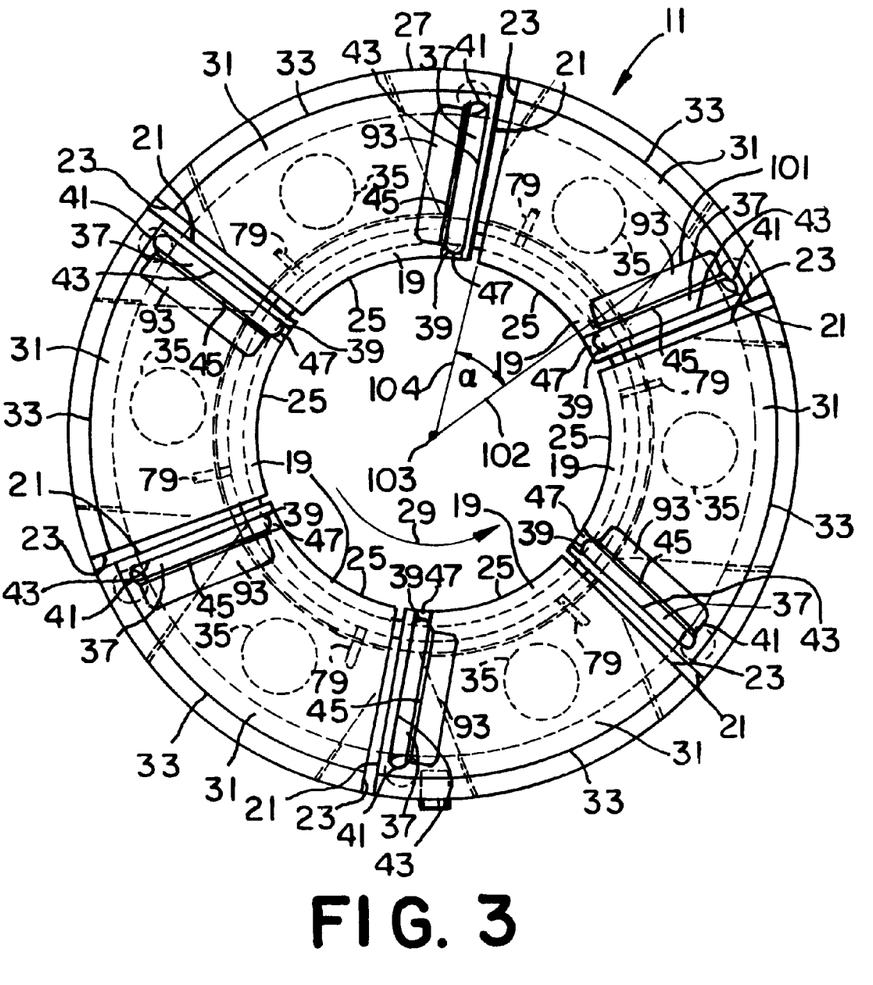
FIG. 3 is a view looking at the faces of the shoes of one of the thrust bearings of FIG. 2.
Figure 4:
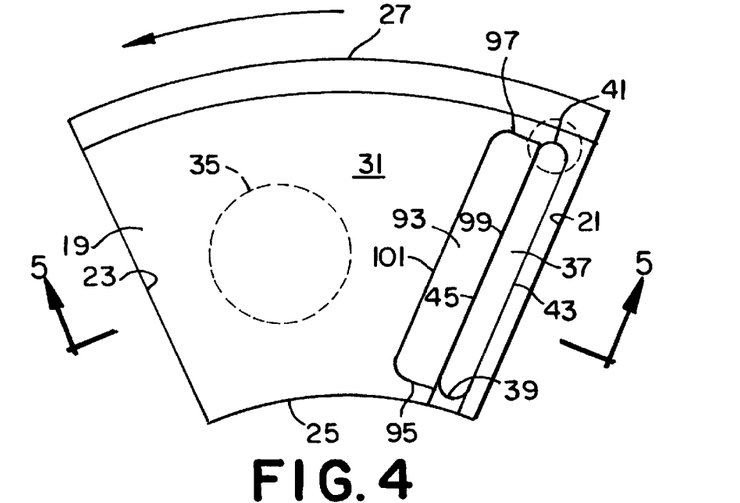
FIG. 4 is a view looking at the face of a shoe of one of the thrust bearings of FIG. 3.
Figure 5:
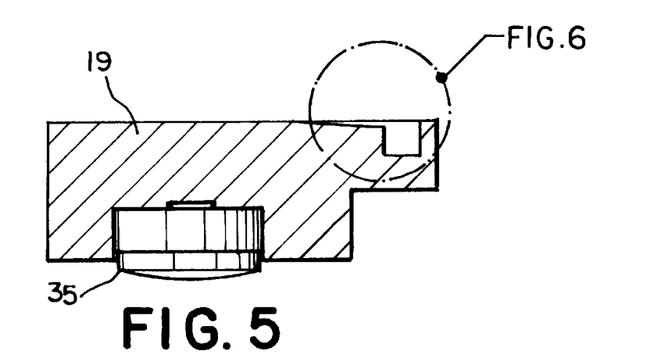
FIG. 5 is a view in section taken as indicated by the lines and arrows 5—5 which appear in FIG. 4.
Figure 6:
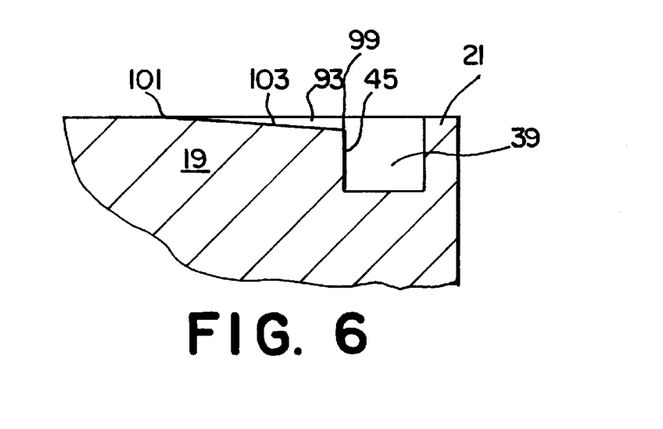
FIG. 6 is an enlarged view taken as indicated by the circle 6 which appears in FIG. 5.

FIGS. 4–6 show a first embodiment of the invention in which the recess 93 forms a ramp 103 in the working face 31 of the shoe 19. In this embodiment of the invention, the depth of the recess 93 is deepest at the leading edge 99 of the recess 93 and diminishes to no depth at the trailing edge 101 of the recess 93. Preferably, the depth of the recess 93 at the leading edge 99 of the recess 93 is 0.0020 inches to 0.0200 inches. The width of the recess 93, that is, the distance from the leading edge 99 of the recess 93 to the trailing edge 101 of the recess 93, is measured at the mean diameter of the shoe 19 and locates the trailing edge 101 of the recess 93. The mean diameter of the shoe 19 is defined as (o.d.+i.d.)/2, with o.d. being the outer diameter of the thrust bearing measured between the outer edges 33 of working faces 31 of two shoes 19 that are opposite to each other and i. d. being the inner diameter of the thrust bearing measured between the inner edges 25 of the working faces 31 of two shoes 19 that are opposite to each other. Preferably, the width of the recess 93 in degrees is 10% to 25% of the active shoe angle α, the active shoe angle α being the interior angle formed by the intersection of (a) a line 102 extending from the trailing edge 101 of the recess 93, at the mean diameter of the shoe 19, to the center 103 of the bearing and (b) a line 104 extending from the trailing edge of the working face 31, which in the embodiments of the invention shown in the drawings corresponds to trailing edge 23 of the shoe 19, at the mean diameter of the shoe 19, to a center 103 of the bearing. (See FIG. 3.) The trailing edge 101, in this embodiment of the invention, is parallel to the leading edge 21 of the shoe 19. The length of the recess 93, that is, the distance from the inner end 95 of recess 93 to the outer end 97 of recess 93, is 75% to 100% of the length of the working face 31 of the shoe 19 (the distance between the inner diameter edge of the working face 31, which in the embodiments of the invention shown in the drawings corresponds to inner diameter edge 25 of the shoe 19, and the outer diameter edge 33 of working face 31 of the shoe 19) and the length of the working face 31 of the shoe 19 is defined as (o.d.−i.d.)/2, with the o.d. being the outer diameter of the thrust bearing measured between the outer edges 33 of working faces 31 of two shoes 19 that are opposite to each other and i.d. being the inner diameter of the thrust bearing measured between the inner edges 25 of working faces 31 of two shoes 19 that are opposite to each other.

Figure 7:
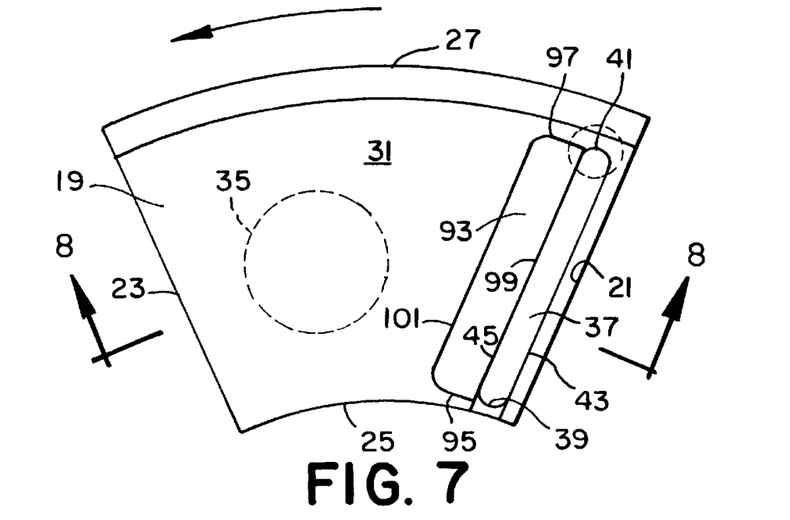
FIG. 7 is a view looking at the face of a shoe used in an alternative embodiment of the invention.
Figure 8:
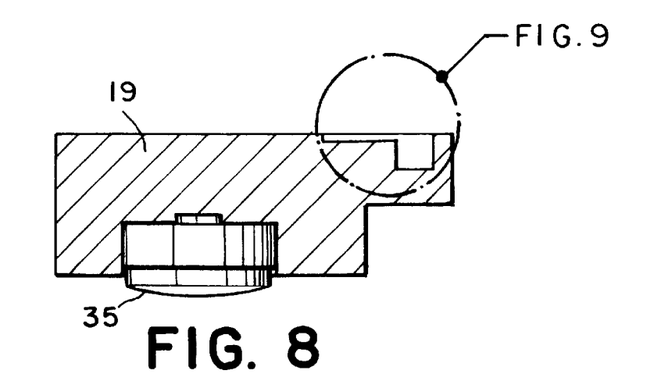
FIG. 8 is a view in section taken as indicated by the lines and arrows 8—8 which appear in FIG. 7.
Figure 9:
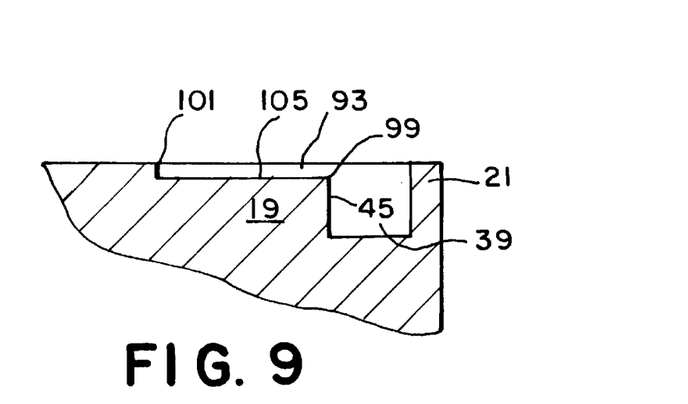
FIG. 9 is an enlarged view taken as indicated by the circle 9 which appears in FIG. 8.
Figure 10:
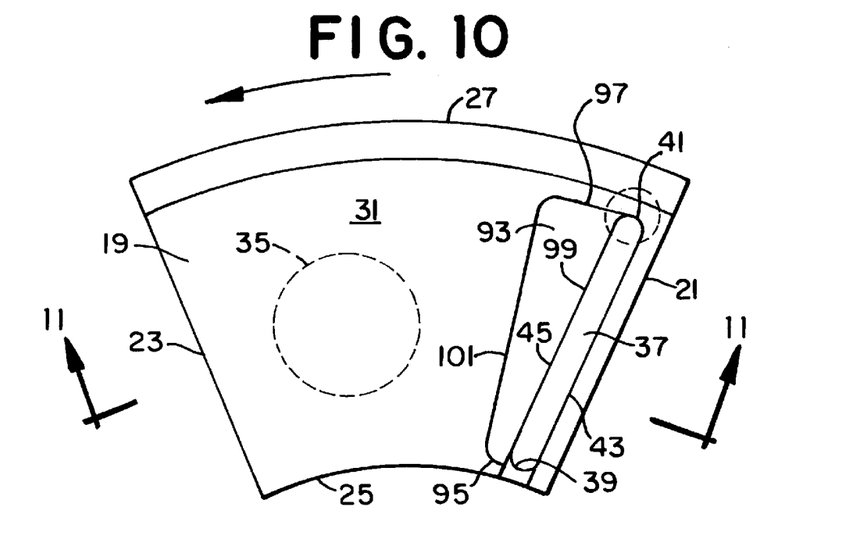
FIG. 10 is a view looking at the face of a shoe used of another alternative embodiment of the invention.
Figure 11:
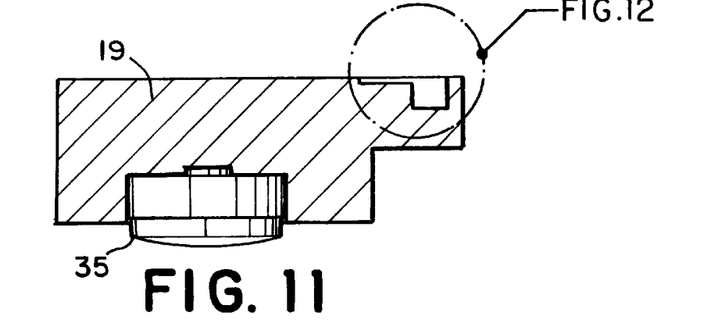
FIG. 11 is a view in section taken as indicated by the lines and arrows 11—11 which appear in FIG. 10.
Figure 12:
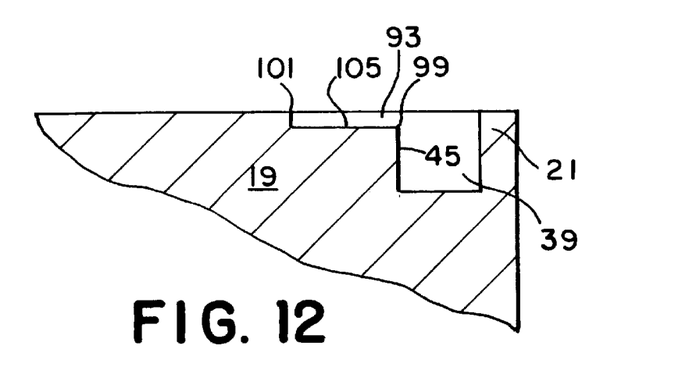
FIG. 12 is an enlarged view taken as indicated by the circle 12 which appears in FIG. 11.

FIGS. 7–9 show a second embodiment of the invention, and FIGS. 10–12 show a third embodiment of the invention. In the second and third embodiments of the invention, recess 93 is a pocketed region. That is, the recess 93 forms a plateau 105 in the working face 31 of the shoe 19 that is sunken below the level of the working face 31 surrounding recess 93. The depth of the pocketed region is preferably 0.0020 inches to 0.0200 inches and is of constant depth. The width of the pocket region, that is, the distance from the leading edge 99 of the recess 93 to the trailing edge 101 of the recess 93, is measured at the mean diameter of the shoe. Preferably, the width of the recess 93 in degrees is 10% to 25% of the active shoe angle. The trailing edge 101 of recess 93 in these embodiments of the invention is either parallel to the shoe leading edge 21 (as with the second embodiment of the invention as shown in FIGS. 7–9), radial from the bearing center (as with the third embodiment of the invention as shown in FIGS. 10–12), or somewhere in between these two. The length of the pocketed region, that is, the distance from the inner end 95 of recess 93 to the outer end 97 of recess 93, is 75% to 90% of the length of the working face 31 of the shoe 19 (the distance between the inner diameter edge of the working face 31, which in the embodiments of the invention shown in the drawings corresponds to the inner diameter edge 25 of the shoe 19, and the outer diameter edge 33 of working face 31 of the shoe 19) and the length of the working face 31 of the shoe 19 is defined as (o.d.−i.d.)/2, with o.d. being the outer diameter of the thrust bearing measured between the outer edges 33 of working faces 31 of two shoes 19 that are opposite to each other and i.d. being the inner diameter of the thrust bearing measured between the outer edges 25 of the working faces 31 of two shoes 19 that are opposite to each other.

Figure 1:
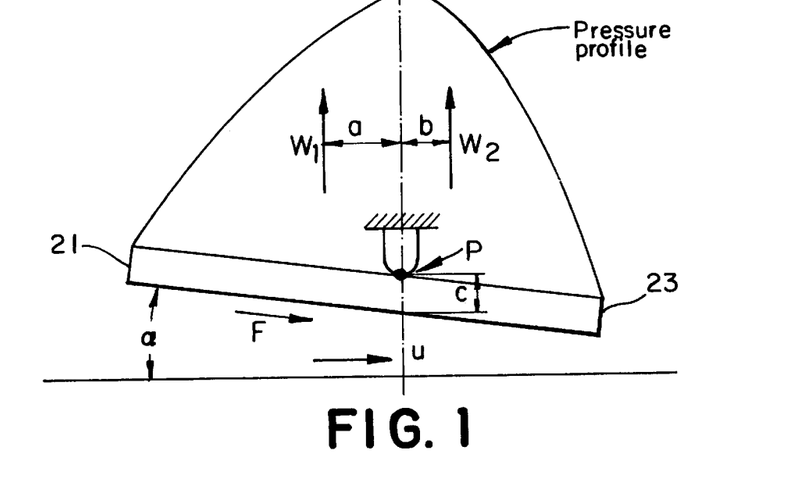
FIG. 1 schematically shows a shoe tilting properly during operation.
Figure 2:
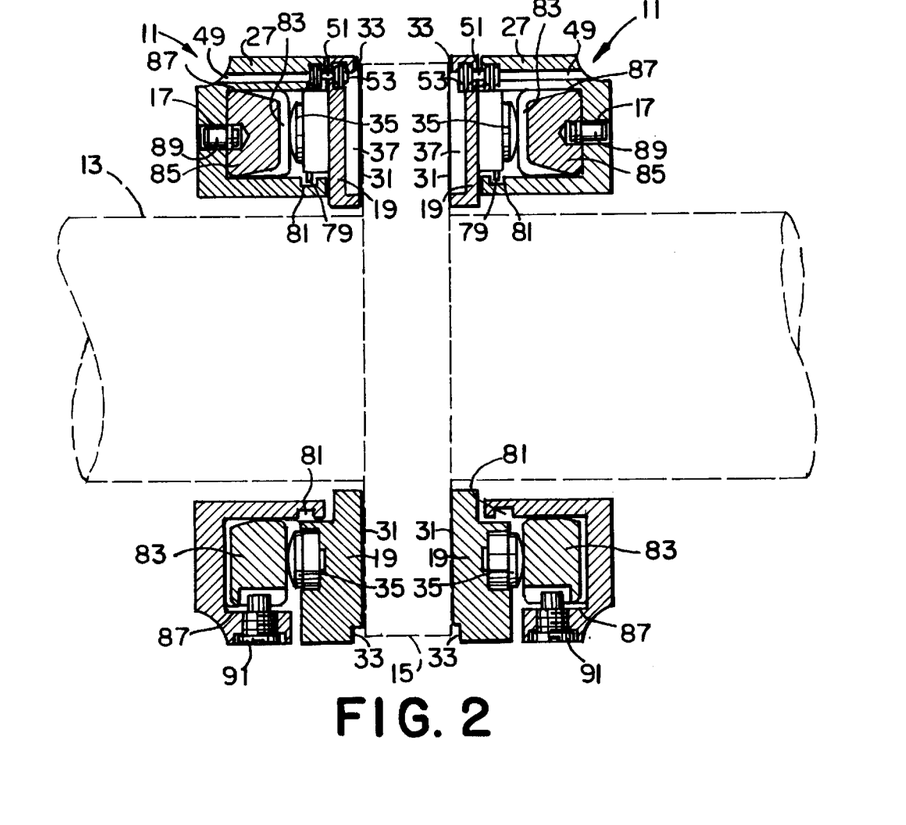
FIG. 2 is a view in elevation of a pair of thrust bearings constructed in accordance with this invention and positioned on each side of a rotating collar mounted on a shaft.

In normal operation, the pressure distribution in the oil film results in a moment acting on the leading portion of the shoe which is greater than the moment created by viscous drag at the shoe surface. This larger oil film pressure moment tilts the shoe so that the leading edge gap (the distance between the shoe at its leading edge 21 and the collar 15) is larger than the trailing edge gap (the distance between the shoe 19 at its trailing edge 23 and the collar 15), which is required for proper operation. FIG. 1 illustrates schematically the proper tilt of the shoe 19 during operation.

With conventional LEG thrust bearings, that is, LEG thrust bearings not having a recess 93, when operating at high speeds and low thrust loads, the viscous drag moment becomes larger as compared to the pressure distribution moment and the tilt of the shoe 19 is reduced such that the shoes 19 are operating with almost no tilt or parallel to the rotating collar 15. This small tilt reduces side leakage and the quantity of oil entering the oil film region. Under this condition, oil can only be forced into the film at high inlet supply pressures. The thrust bearings 11 of the invention do not suffer from this condition since the recess 93 formed in the working face 31 of the shoe 19 causes hydrodynamic film pressure to develop on the leading edge 21 of each shoe 19, and this hydrodynamic film pressure causes the shoes 19 to tilt properly, that is, with the gap between the shoe 19 at its leading edge 21 and the collar 15 being larger than the gap between the shoe 19 at its trailing edge 23 and the collar 15, when operating at low thrust loads. Recess 93 creates hydrodynamic film pressure on the leading edge 21 of the shoe 19, which creates a moment opposite to the viscous drag moment. The smaller the leading edge gap (the distance between the shoe 19 at its leading edge 21 and the collar 15) is, the larger the effect of recess 93 is. Also, the dimensions of recess 93 can be varied at the design stage for different applications.

Once a higher load is applied, the oil film pressures dominate the moments and the bearing operates as it normally would.

Figure 13:
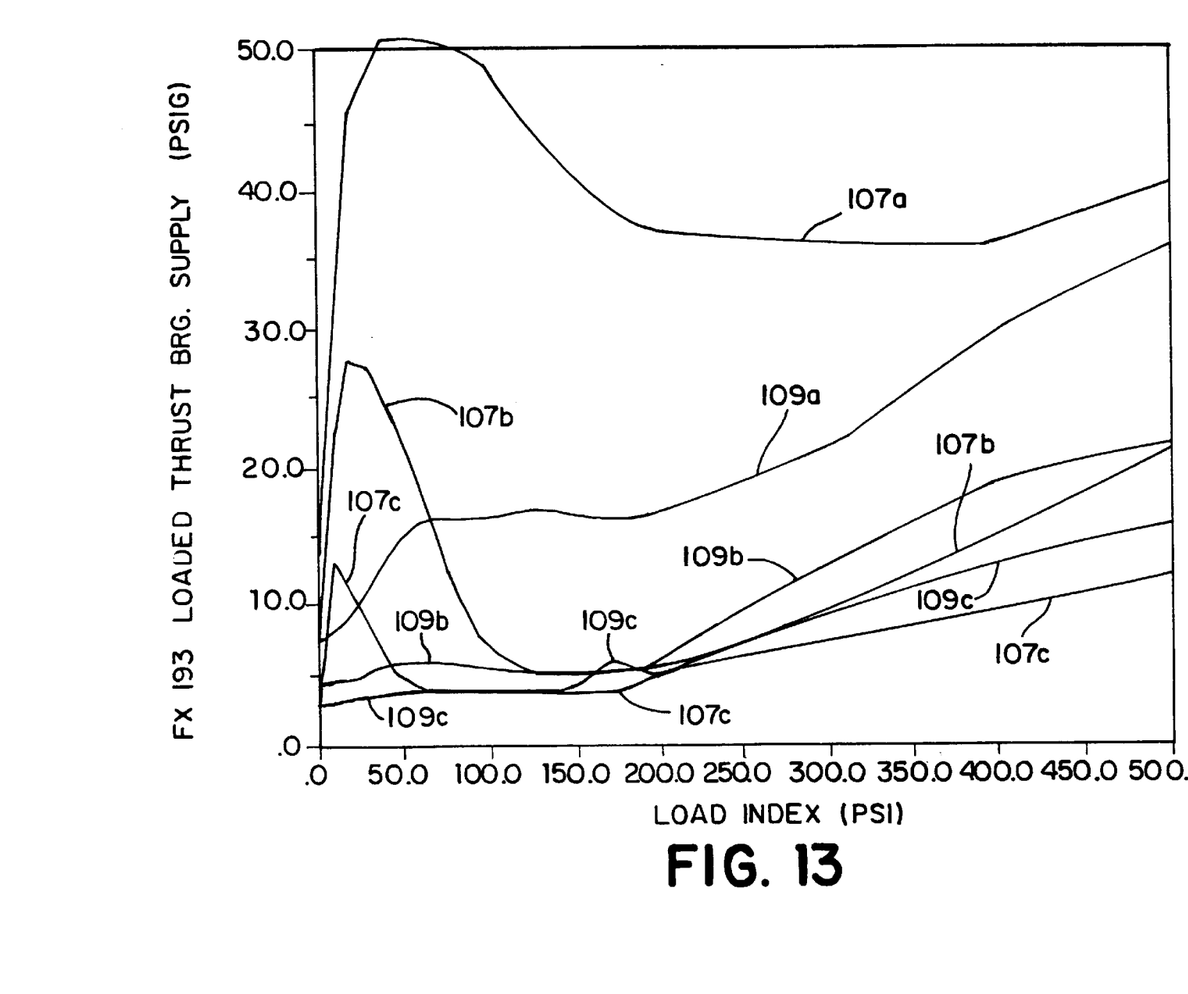
FIG. 13 is a graph which compares oil supply pressure against load of a standard 10½ inch Kingsbury LEG thrust bearing as shown and described in Kingsbury's U.S. Pat. No. 4,501,505, and a 10½ inch Kingsbury LEG thrust bearing constructed in accordance with this invention.

In FIG. 13, line 107a indicates the oil supply pressure versus load for a standard 10½ inch LEG thrust bearing at 12.0 KRPM, and line 109a indicates the oil supply pressure versus load for a 10½ inch LEG thrust bearing constructed in accordance with the invention at 12.0 KRPM. Likewise, in FIG. 13, line 107b indicates the oil supply pressure versus load for a standard 10½ inch LEG thrust bearing at 10.0 KRPM, and line 109b indicates the oil supply pressure versus load for a 10½ inch LEG thrust bearing constructed in accordance with the invention at 10.0 KRPM. In FIG. 13, line 107c indicates the oil supply pressure versus load for a standard 10½ inch LEG thrust bearing at 8.0 KRPM, and line 109c indicates the oil supply pressure versus load for a 10½ inch LEG thrust bearing constructed in accordance with the invention at 8.0 KRPM.

The term "KRPM" is an abbreviation for "kilo rotations per minute". Accordingly, 12.0 KRPM equals 12,000 rotations per minute, 10.0 KRPM equals 10,000 rotations per minute, and 8.0 KRPM equals 8,000 rotations per minute.

In the standard LEG thrust bearing, the oil supply pressure at 12.0 KRPM the oil supply pressure ranges between about 30.0 psig and about 52.0 psig when the load is between about 10 psi and 100 psi. However, at 12.0 KRPM, the oil supply pressure of an LEG thrust bearing constructed in accordance with the invention ranges from about 8.0 psig to about 16.0 psig when the load is between 10.0 psi and 100.0 psi.

In the standard LEG thrust bearing, the oil supply pressure at 10.0 KRPM ranges between about 22.0 psig and about 28.0 psig when the load is between about 10 psi and 50 psi. However, at 10.0 KRPM, the oil supply pressure of an LEG thrust bearing constructed in accordance with the invention ranges from about 4.0 psig to about 6.0 psig when the load is between 10.0 psi and 50.0 psi.

In the standard LEG thrust bearing, the oil supply pressure at 8.0 KRPM is about 13.0 psig at a load of about 10 psi. However, at 8.0 KRPM, the oil supply pressure of an LEG thrust bearing constructed in accordance with the invention is about about 3.0 psig at a load of about 10 psi.

In summary, the data of FIG. 13 shows a substantial drop in the required supply pressure for the LEG thrust bearing constructed in accordance with the invention.

Figure 14:
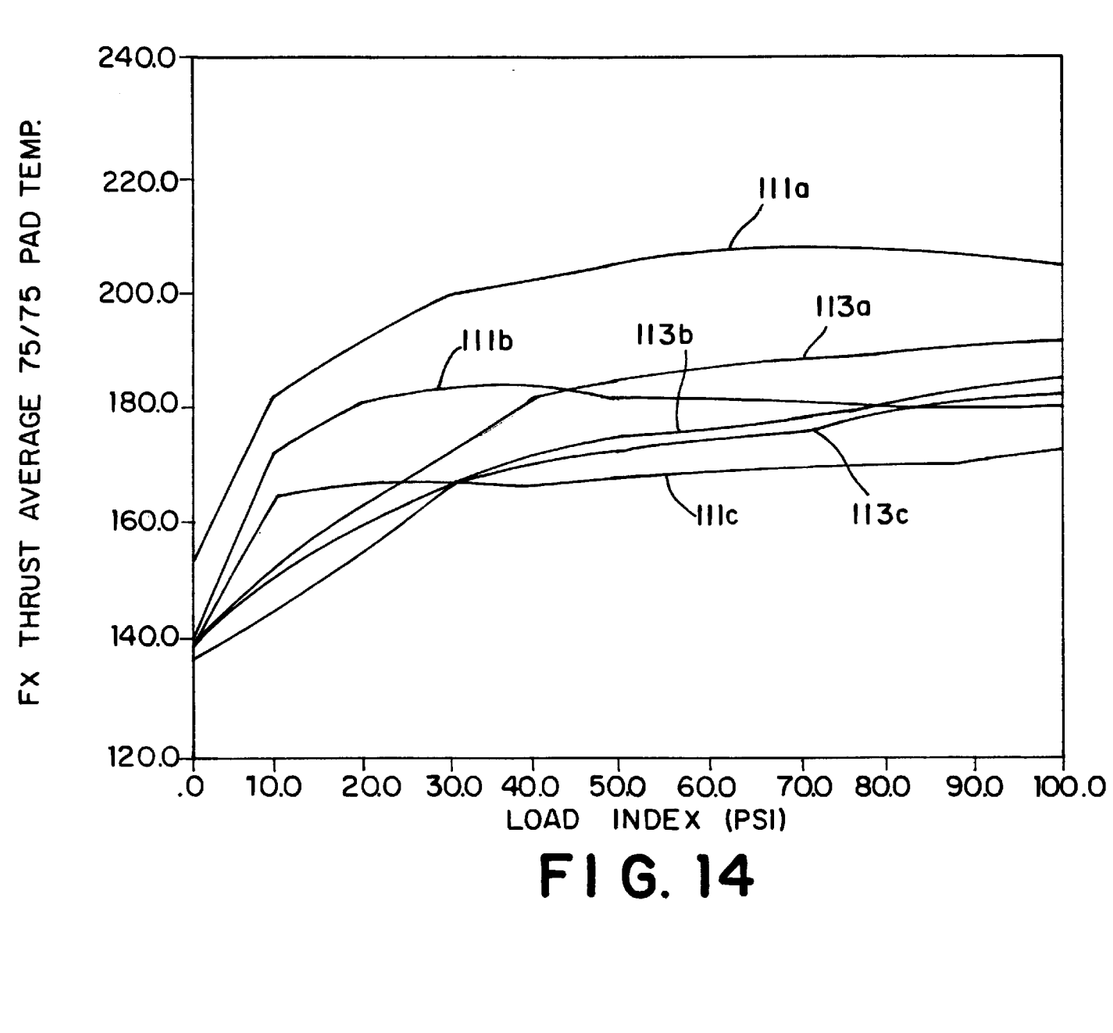
FIG. 14 is a graph which plots temperature in 5 degrees Fahrenheit against load of a standard 10½ inch Kingsbury LEG thrust bearing against a 10½ inch Kingsbury LEG thrust bearing of the invention.

In FIG. 14, line 111a, 111b, and 111c indicate the oil film temperature verses load at 12.0 KRPM, 10.0 KRPM, and 8.0 KRPM, respectively, for standard LEG thrust bearings, and lines 113a, 113b, 113c show oil film temperature verses load at 12.0 KRPM, 10.0 KRPM, and 8.0 KRPM, respectively, for LEG thrust bearings constructed in accordance with the invention. A marked oil film temperature reduction occurs with the LEG thrust bearings constructed in accordance with the invention in the range of light loads (less than 25 psi).

The inventive thrust bearing provides proper shoe tilt so that the gap between the shoe 19 at its leading edge 21 and the collar 15 is greater than the gap between the shoe 19 at its trailing edge 23 and the collar 15, in all conditions of operation. With the inventive thrust bearing, normal tilting occurs throughout the design speed range for the thrust bearing during all conditions of operations so that the bearing operates at both light loads (with proper tilt being provided from the hydrodynamic film pressure created by recess 93) and high loads (with proper tilt resulting from the oil film pressures encountered at higher loads).

What is claimed is:

1. A thrust bearing for use with a shaft having a collar mounted thereon, comprising a base ring, a series of thrust bearing shoes positioned on the base ring, each shoe having a leading edge connected to a trailing edge by an inner diameter edge and an outer diameter edge, each thrust bearing shoe having a working face, shoe pivot means on each shoe allowing the shoe to pivot in any direction, an oil distribution groove formed in the working face of each shoe near the leading edge of each shoe and extending radially for substantially the entire distance between the inner and outer diameter edges of each shoe, each oil distribution groove having an inner end and an outer end connected by a leading edge and a trailing edge, oil feed means leading to each oil distribution groove for feeding oil to each oil distribution groove, and a recess formed in the working face of each shoe commencing at the trailing edge of the oil distribution groove and extending rearwardly therefrom to develop hydrodynamic film pressure on the leading edge of each shoe to ensure that each shoe tilts properly at light loads.

2. The thrust bearing of claim 1, the recess being a pocketed region.

3. The thrust bearing of claim 2, further including retaining means for assisting the retention of the shoes on the base ring, a series of upper and lower leveling plates for equalizing the load on the series of shoes, and a bleed groove extending radially from the inner end of the oil distribution groove of each shoe to the inner diameter edge of each shoe for supplying oil to the inner diameter area of each shoe downstream of the bleed groove which downstream inner diameter area would be starved of oil by centrifugal inertial effects of rotating the collar, the trailing edge of the oil distribution groove being a chamfered edge for more easily allowing oil to flow from the oil distribution groove to cover the working face of the shoe with oil, the trailing edge of the oil distribution groove being a chamfered edge for more easily allowing oil to flow from the oil distribution groove to cover the working face of the shoe with oil, the pocketed region having a constant depth of 0.0020 inches to 0.0200 inches, the bearing having an active shoe angle, the pocketed region having a width in degrees of 10% to 25% of the active shoe angle, the working face having a length, and the recess having a length that is 75% to 100% of the length of the working face.

4. The thrust bearing of claim 2, the pocketed region having a constant depth of 0.0020 inches to 0.0200 inches.

5. The thrust bearing of claim 4, the low point of the recess being 0.0020 inches to 0.0200 inches.

6. The thrust bearing of claim 4, the bearing having an active shoe angle, and the recess having a width in degrees of 10% to 25% of the active shoe angle.

7. The thrust bearing of claim 4, the recess having a trailing edge that is parallel to the trailing edge of the oil distribution groove.

8. The thrust bearing of claim 4, the working face having a length, and the recess having a length that is 75% to 100% of the length of the working face.

9. The thrust bearing of claim 4, further including retaining means for assisting the retention of the shoes on the base ring, a series of upper and lower leveling plates for equalizing the load on the series of shoes, and a bleed groove extending radially from the inner end of the oil distribution groove of each shoe to the inner diameter edge of each shoe for supplying oil to the inner diameter area of each shoe downstream of the bleed groove which downstream inner diameter area would be starved of oil by centrifugal inertial effects of rotating the collar, the trailing edge of the oil distribution groove being a chamfered edge for more easily allowing oil to flow from the oil distribution groove to cover the working face of the shoe with oil, the trailing edge of the oil distribution groove being a chamfered edge for more easily allowing oil to flow from the oil distribution groove to cover the working face of the shoe with oil, the low point of the recess being 0.0020 inches to 0.0200 inches, the bearing having an active shoe angle, the recess having a width in degrees of 10% to 25% of the active shoe angle, the working face having a length, and the recess having a length that is 75% to 100% of the length of the working face.

10. The thrust bearing of claim 2, the bearing having an active shoe angle, and the pocketed region having a width in degrees of 10% to 25% of the active shoe angle.

11. The thrust bearing of claim 2, the recess having a trailing edge that is parallel to the trailing edge of the oil distribution groove.

12. The thrust bearing of claim 2, the bearing having a center, and the recess having a trailing edge that extends along a line defined by a radial line extending from the bearing center.

13. The thrust bearing of claim 2, the working face having a length, and the recess having a length that is 75% to 100% of the length of the working face.

14. The thrust bearing of claim 1, the recess forming a ramp extending rearwardly from a low point at the trailing edge of the oil distribution groove.

15. The thrust bearing of claim 1, further including retaining means for assisting the retention of the shoes on the base ring.

16. The thrust bearing of claim 1, further including a series of upper and lower leveling plates for equalizing the load on the series of shoes.

17. The thrust bearing of claim 1, the trailing edge of the oil distribution groove being a chamfered edge for more easily allowing oil to flow from the oil distribution groove to cover the working face of the shoe with oil.

18. The thrust bearing of claim 1, further including a bleed groove extending radially from the inner end of the oil distribution groove of each shoe to the inner diameter edge of each shoe for supplying oil to the inner diameter area of each shoe downstream of the bleed groove which downstream inner diameter area would be starved of oil by centrifugal inertial effects of rotating the collar.

19. The thrust bearing of claim 18, the recess having a trailing edge that is parallel to the trailing edge of the oil distribution groove.

20. The thrust bearing of claim 18, the bearing having a center, and the recess having a trailing edge that extends along a line defined by a radial line extending from the bearing center.

21. The thrust bearing of claim 20, the recess having a trailing edge that is parallel to the trailing edge of the oil distribution groove.

* * * * *